Aug. 19, 1947.　　　F. McGUIRE, JR　　　2,425,751
METHOD OF AND APPARATUS FOR FLAME HARDENING GEAR TEETH
Filed June 29, 1940　　　5 Sheets-Sheet 1

INVENTOR
FRANK McGUIRE JR
BY
ATTORNEY

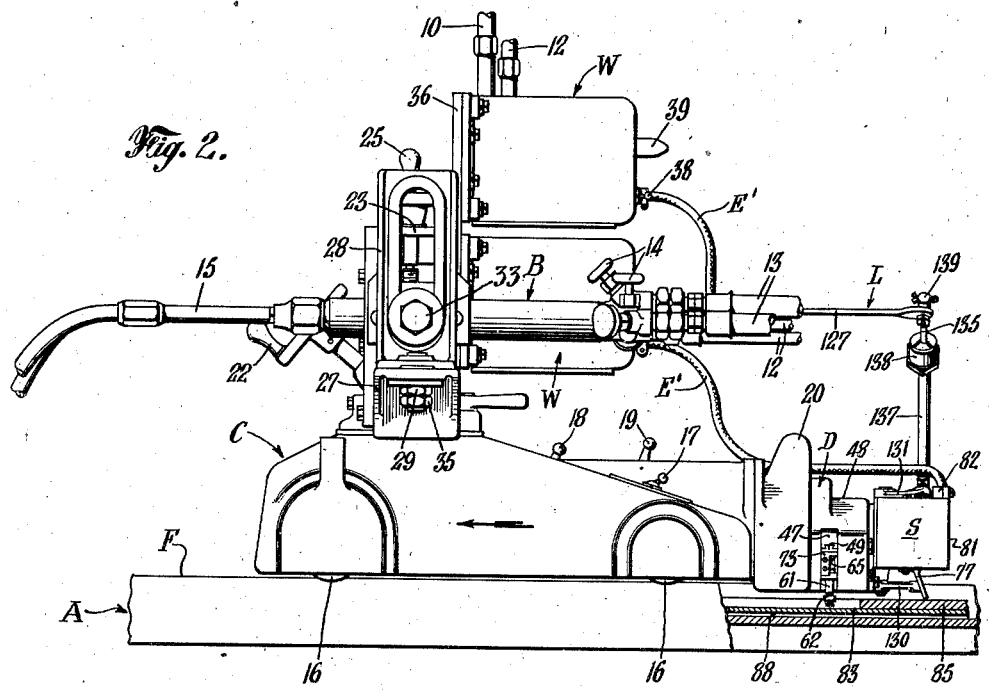

Aug. 19, 1947.  F. McGUIRE, JR  2,425,751
METHOD OF AND APPARATUS FOR FLAME HARDENING GEAR TEETH
Filed June 29, 1940  5 Sheets-Sheet 3

INVENTOR
FRANK McGUIRE JR.
BY
ATTORNEY

Aug. 19, 1947.  F. McGUIRE, JR  2,425,751
METHOD OF AND APPARATUS FOR FLAME HARDENING GEAR TEETH
Filed June 29, 1940  5 Sheets-Sheet 4

INVENTOR
FRANK McGUIRE JR.
BY
ATTORNEY

Aug. 19, 1947.   F. McGUIRE, JR   2,425,751
METHOD OF AND APPARATUS FOR FLAME HARDENING GEAR TEETH
Filed June 29, 1940   5 Sheets-Sheet 5

INVENTOR
FRANK McGUIRE JR.
BY
ATTORNEY

Patented Aug. 19, 1947

2,425,751

UNITED STATES PATENT OFFICE 2,425,751

METHOD OF AND APPARATUS FOR FLAME HARDENING GEAR TEETH

Frank McGuire, Jr., Bogota, N. J., assignor to The Linde Air Products Company, a corporation of Ohio Application June 29, 1940, Serial No. 343,063

26 Claims. (Cl. 148—13)

This invention relates to blowpipe apparatus, such as is useful in the heat treatment of gear teeth, and more particularly to a method of and apparatus for flame hardening gear teeth. Specifically contemplated by this invention are an improved method of and apparatus for flame hardening tapered gear teeth, such as the teeth of bevel gears, which vary from one end to the other in width and also in cross-sectional area.

In the flame hardening of gear teeth, high temperature heating flames are directed against successive portions of the wearing surfaces of a tooth to heat the same to a temperature at or above the critical range. Jets of cooling medium, such as water, are directed against the heated surface portions immediately following the heating flames to cool the surface portions rapidly and thereby harden the same. The heating flames may be produced by a combustible mixture of gases, such as oxygen and acetylene, and such combustible mixture may be formed in a suitable blowpipe or blowpipes provided with heads from which the heating flames and cooling jets are directed against the oppositely disposed wearing surfaces of the gear tooth.

A particular problem involved in the flame hardening of gear teeth is occasioned by the fact that heat tends to build up, or run ahead of the heating flames as the surfaces of a tooth are traversed, due to heat conducted ahead from surface portions previously heated. Such preheating is cumulative in effect and is particularly pronounced at the end of a tooth, since there is no metal ahead of the end of the tooth into which heat will be conducted. Such a preheating effect can be avoided by directing cooling water against each surface slightly ahead of the heating flames, so that the heating flames will impinge upon surface portions which are relatively cool. However, this is uneconomical because more heat is required than would otherwise be necessary, and consequently more heating gases are consumed.

A more economical manner of overcoming the effect of preheating is to increase the relative speed of traverse as heat builds up—i. e., increase the speed slightly as the greater portion of a tooth is traversed and considerably increase the speed as the end of the tooth is reached. Special apparatus has been developed to obtain the desired speed variation, such apparatus normally comprising a hydraulically-operated ram which carries the blowpipes and including various valves and other appurtenant parts for controlling the speed of the ram. Such apparatus is extremely costly and can be used for only one purpose—that of hardening gear teeth. The high initial cost of such apparatus renders the flame hardening of gears uneconomical in many instances, particularly for those who harden such a small number of gears that the apparatus is in use only part of the time. Furthermore, such apparatus is extremely complicated and difficult to move from one place in a shop to another, and repair parts are expensive and difficult to replace.

Fortuitously, the relative rate of traverse of the blowpipes in the flame hardening of gear teeth and also other metal bodies (normally between 4 and 12 inches per minute) falls within the ranges of cutting and welding speeds. Consequently, the same traversing mechanism normally can be used for flame hardening, for cutting, and for welding. At the present time there are available compact, portable, electrically operated traversing mechanisms which are primarily designed for traversing welding or cutting blowpipes relatively to work, but which are admirably suited for effecting the traversal of flame hardening blowpipes. Thus, an object of this invention is to provide apparatus for hardening the teeth of spur gears, or the tapered teeth of bevel gears, which can be effectively mounted on, and/or cooperate with, a portable, electrically operated traversing mechanism which is also useful for other purposes, such as for traversing a welding or cutting blowpipe along a welding seam or cutting line.

Another object of this invention is to provide a novel method of and apparatus for treating what may be termed "tapered" gear teeth, i. e., teeth which vary in height as well as cross-sectional area from one end to the other. An example of tapered gear teeth are those of bevel gears. Heretofore, it has not been possible to harden as far down the side of a bevel tooth at the large end as is desired. The height of the area heated by the heating flames normally is limited by the height of the tooth at the small end so that when the flames arrive at the large end of the tooth, the flame coverage is entirely insufficient. Attempts have been made to provide satisfactory blowpipes which would direct a lesser number of heating flames against the small end of a tapered gear tooth and an increasing number of heating flames against the tooth surface as the large end was approached. However, as far as is known, such attempts have been unsuccessful.

Further objects of this invention are to provide novel apparatus for flame hardening the teeth of spur or bevel gears, or the teeth of other types of gears; to provide such apparatus by which a maximum amount of flexibility is secured but without any considerable increase in cost or the number of parts; to provide such apparatus by which speed variations during traverse may be obtained automatically; to provide such apparatus by which the heating gases for the blowpipes may be turned on and off automatically; to provide such apparatus which may be mounted on a wheeled carriage or traversing mechanism running on a flanged track, such as an I-beam, and which includes control elements disposed beneath the traversing mechanism and thereby located between the flanges of the track in a protected position; and to provide an adjustable template which may be used for treating a variety of gear teeth.

A still further object of this invention is to provide a simplified apparatus particularly suited for flame hardening the teeth of spur gears, the parts of such apparatus being few, simple and cheap, but permitting the speed of traverse to be adjusted manually with a high degree of accuracy.

Other objects and novel features of this invention will become apparent from the following description and accompanying drawings, in which:

Fig. 2 is a side elevation, partly in section, of the apparatus of Fig. 1;

Fig. 3 is a rear elevation of the apparatus and spur gear of Fig. 1;

Figure 1:
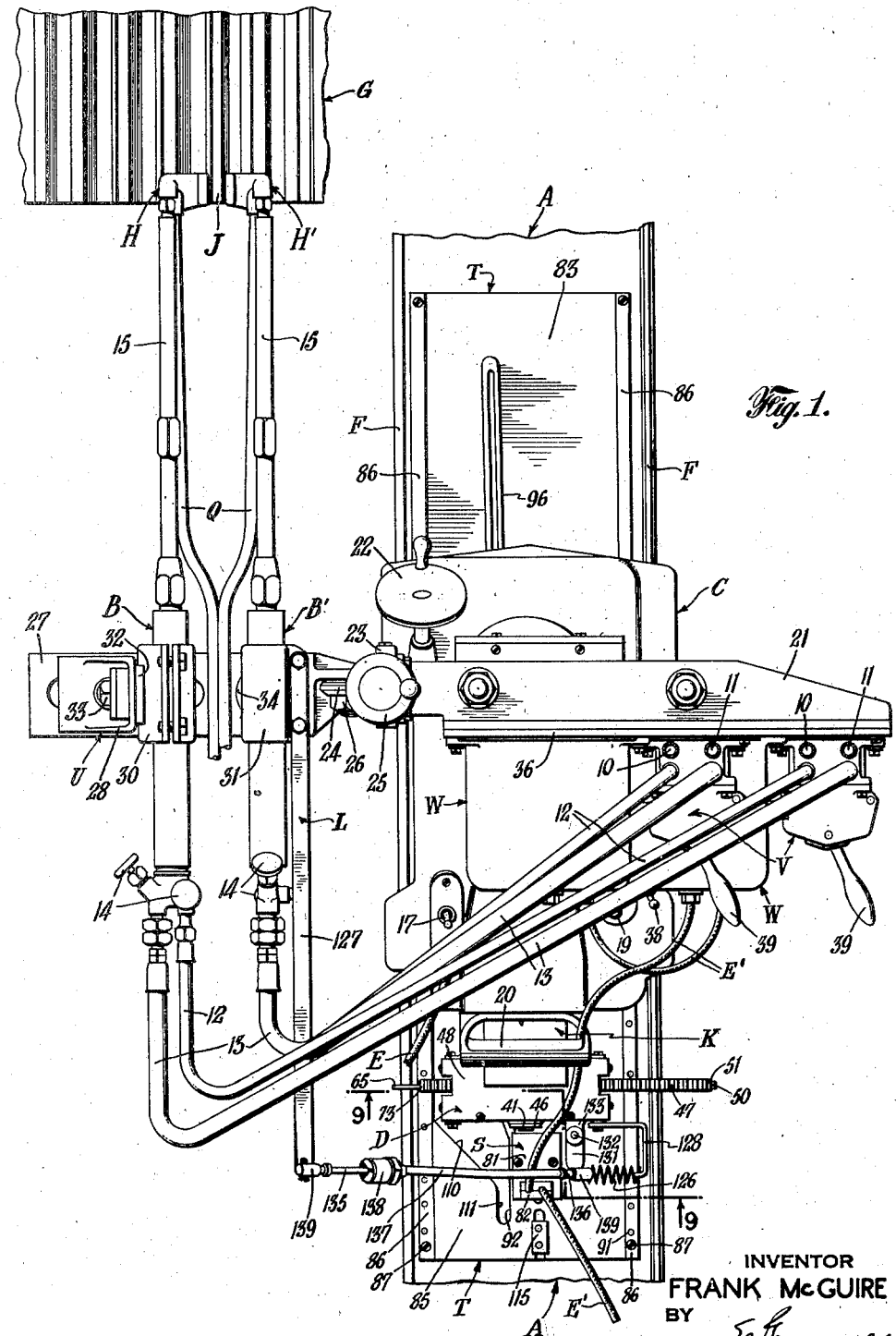
Fig. 1 is a top view, looking downwardly, of apparatus constructed in accordance with this invention, illustrated in operative position for hardening the teeth of a spur gear.
Figure 4:
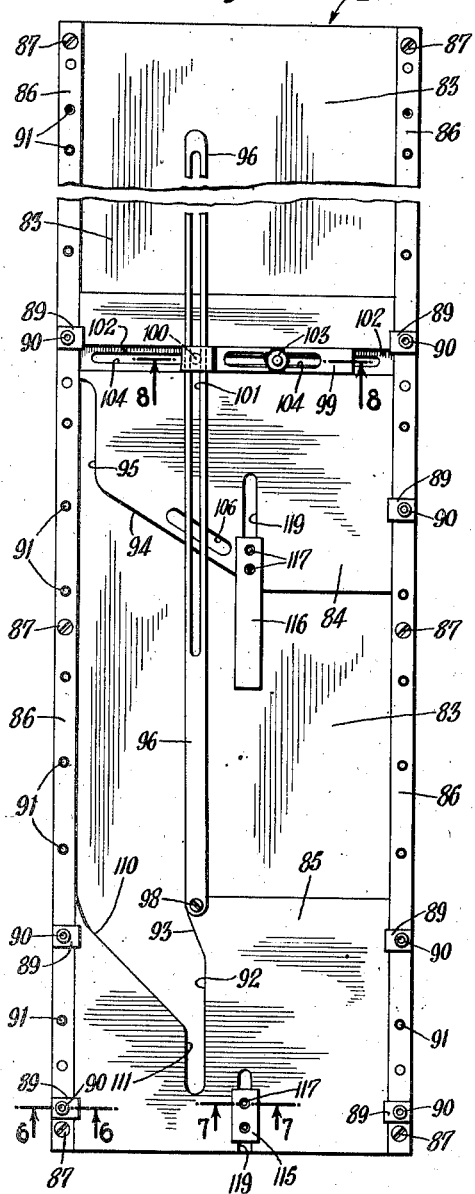
Fig. 4 is a top view, looking downwardly, of a template used in controlling the operation of the apparatus of Fig. 1 in hardening the teeth of a spur gear.
Figure 5:
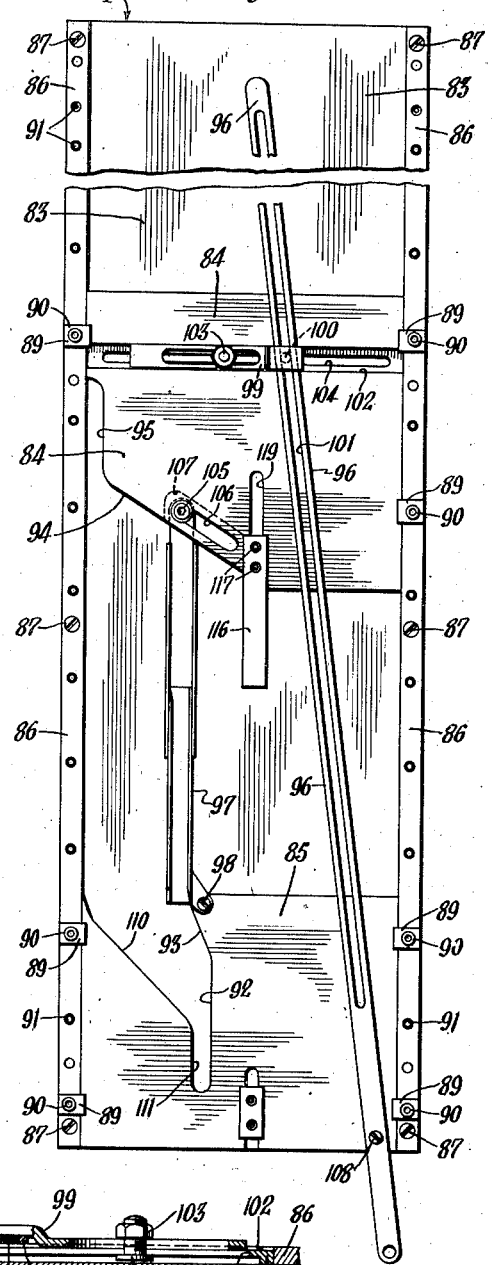
Fig. 5 is a top view of the template of Fig. 4, the parts of which are adjusted for controlling the operation of the apparatus of Fig. 1 in hardening the teeth of a bevel gear.
Figures 6, 7, 8:
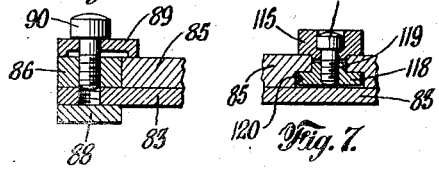
Figure 9:
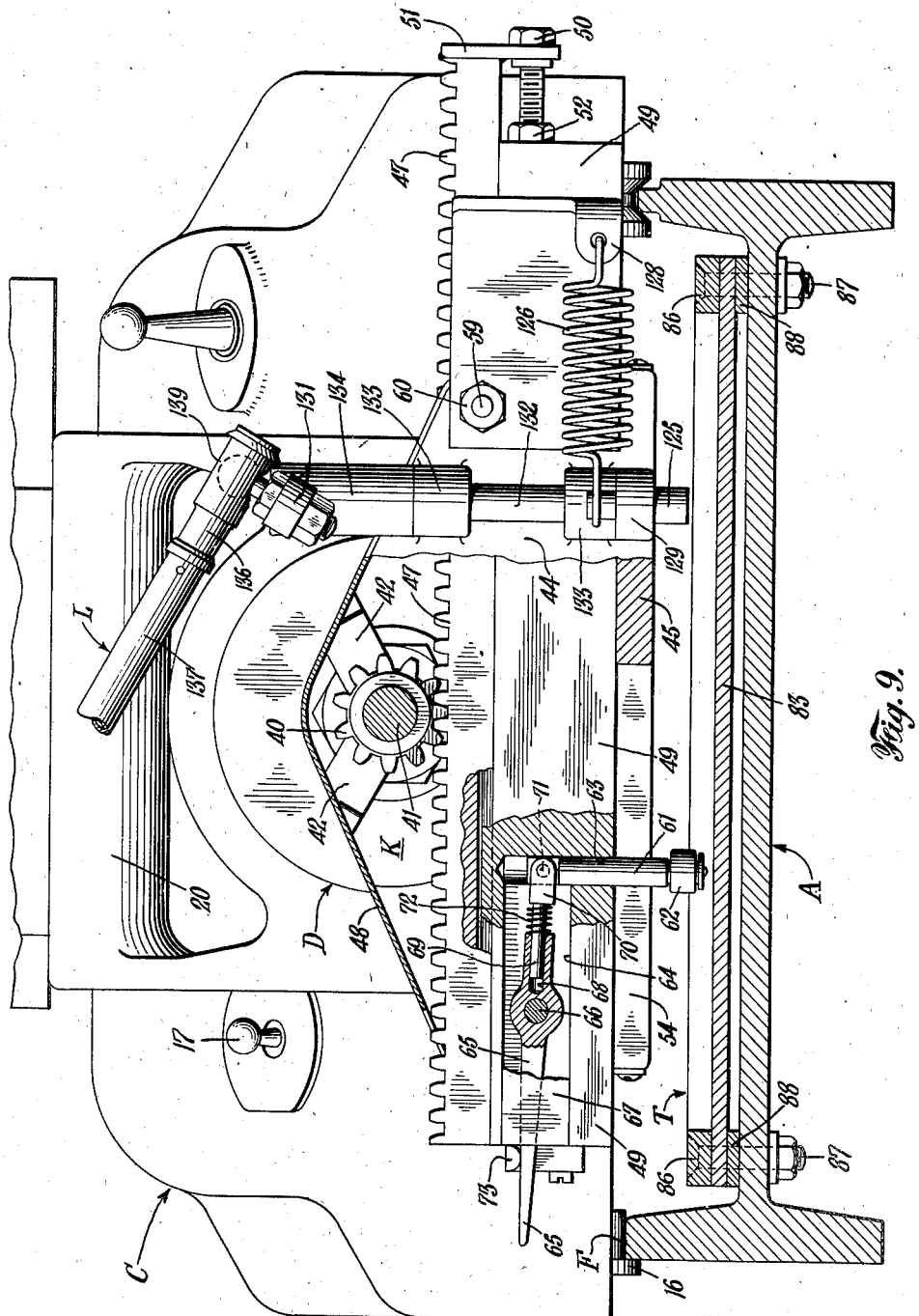
Figure 10:
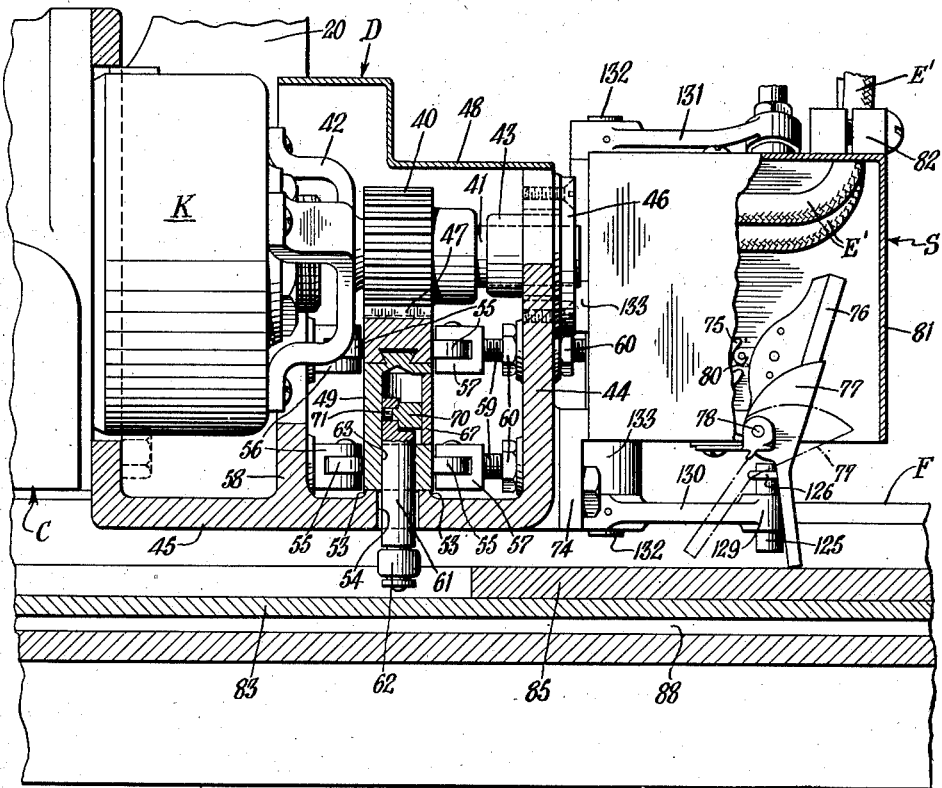
Figure 11:
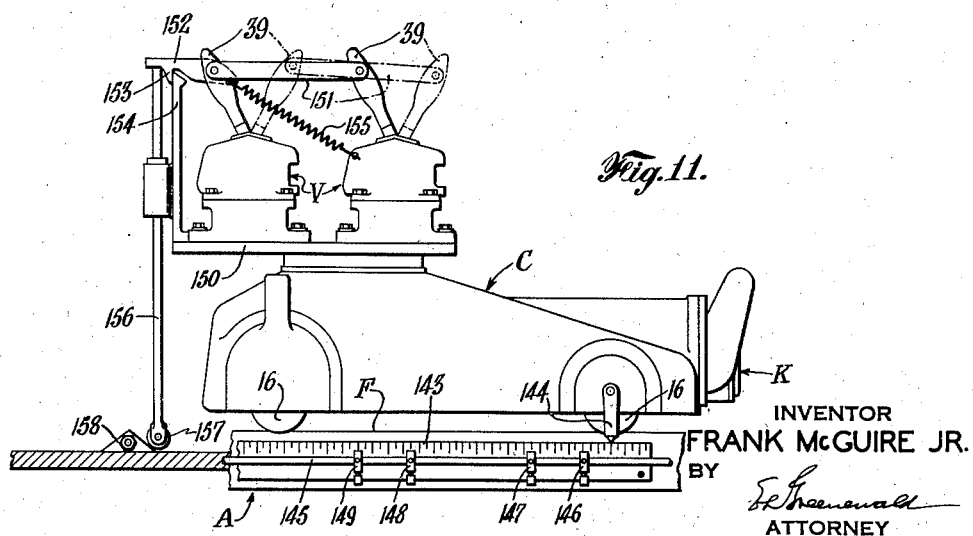

Figs. 6 to 8, inclusive, are partial vertical sectional views, respectively taken along lines 6—6, 7—7, and 8—8 of Fig. 4;

Fig. 9 is an enlarged transverse vertical sectional view taken along line 9—9 of Fig. 1, and Fig. 10 is an enlarged longitudinal vertical sectional view of the rear portion of the apparatus of Fig. 1, together illustrating in greater detail those portions of the apparatus of Fig. 1 which actively cooperate with the template of Figs. 4 and 5; and Fig. 11 is a side elevation of a simplified apparatus by which accurate manual control of the speed of traverse may be obtained.

Referring to Fig. 1, apparatus constructed in accordance with this invention may include, in general, a traversing mechanism or carriage C which runs on a track A; a blowpipe support U mounted on the carriage; and a pair of blowpipes B and B' provided with heads H and H' which direct heating flames, followed by quenching jets, against successive portions of the opposite surfaces of a tooth J of a gear G. A suitable combustible mixture of gases, such as oxygen and acetylene, is supplied heads H and H' from blowpipes B and B', and a supply of quenching medium, such as water, is supplied heads H and H' by quench supply tubes Q.

The carriage C, as illustrated herein, is similar to that disclosed in J. H. Bucknam and A. J. Miller Patent No. 2,183,605, and comprises an air-tight housing within which the operating parts are assembled. Carriage C is driven by a suitable variable speed motor supplied with electricity by a cable E, and the speed of the motor is controlled by a governor having a speed adjusting cap K. A speed control device D, actuated by a template T which is disposed between rails or flanges F of track A, automatically adjusts the position of governor cap K during hardening. The speed of carriage C is preferably so controlled that the carriage is moved relatively slowly as the initial portions of the tooth surfaces are being heated; as heat "picks up" or just as the initial portions of the tooth surfaces become heated to the critical temperature, the speed is increased slightly; as successive portions of the tooth surfaces are heated, the speed is further increased slightly; and just before the end of the tooth is reached, the speed is increased considerably.

The flow of heating gases to blowpipes B and B' and thence to heads H and H' is controlled by valves V, the opening and closing of which is in turn controlled by solenoids W. The operation of solenoids W is controlled by a switch S (see Fig. 10), which is mounted on the rear of speed control device D. A cable E', which passes to switch S and thence to solenoids W, supplies electricity for energization of the solenoids. In general, switch S is actuated by template T so that the heating gases are turned on just before the tooth J is reached by the heating heads and turned off just as the heating heads reach the end of the tooth.

In treating tapered gear teeth, such as the teeth of bevel gears, or other teeth which vary in width and/or cross-sectional area, in accordance with this invention, heads H and H' are not kept at constant distances from the surfaces of the tooth as in the treatment of the teeth of spur gears, but each head is spaced at progressively greater distances from the respective surface of the tooth as the heads move from the small to the large end of the tooth. This increased spacing results in a greater vertical flame coverage, i. e., the effective height of tooth surface heated progressively increases as the large end of the tooth is approached. The increased spacing also permits slower operating speeds without melting the surface under treatment; thus obtaining a soaking heat and greater case penetration and spread. While the heating effect of the flames normally would tend to become less as the large end is approached, due to the greater distance of each head from the surface being treated, the heads are positioned at the small end at a slightly less distance from the surface than in treating the teeth of spur gears, so that an increased heating effect will be obtained at the large end where the greatest amount of heat is necessary.

In carrying out the above method, track A is placed so that flanges F diverge from the center line of the tooth under treatment at an angle slightly greater than the angle at which the sides of the tooth diverge therefrom. This causes head H, which is relatively fixed, to traverse a path which is parallel to flanges F, but which diverges from the left side of the tooth being treated. At the same time, blowpipe B' is caused to pivot on support U by a lever mechanism L. Lever mechanism L extends rearwardly and then at an angle downwardly to a point at the rear of carriage C, where it is actuated by template T so as to cause blowpipe B' to pivot and thereby cause head H' to move away from head H the desired amount. Thus, each head traverses a path which diverges at substantially the same angle from the center line of the tooth under treatment, and at any instant either head will be spaced the same distance from its respective tooth surface as the other head, so that oppositely disposed portions of the tooth surfaces will be heated and quenched simultaneously.

Each of heads H and H' is provided with a plurality of combustible mixture or heating outlets and a plurality of cooling fluid or quenching outlets. Heads H and H' are preferably constructed, and the heating and quenching outlets in heads H and H' are preferably arranged, in accordance with the application of Roger O. Day, Serial No. 169,373, filed October 16, 1937, now Patent No. 2,224,006, issued December 3, 1940. As disclosed in the above application, the heating outlets are disposed in two parallel rows extending from adjacent the bottom to adjacent the top of the tooth, with adjoining outlets spaced closely together at the lower end of each row and at successively increasing distances apart to the upper end of each row. This spacing of the outlets, and hence of the heating flames, results in a greater amount of heat being supplied at the base of the tooth and thus compensates for the tendency for a greater amount of heat to be conducted away from the base of the tooth. Also, in such heads, the quenching outlets are preferably disposed in two rows substantially parallel to the rows of heating outlets, and the quenching outlets are also inclined rearwardly at an angle away from the heating flames to prevent interference with the flames by the quenching jets.

A suitable combustion-supporting gas, such as oxygen, and a suitable combustible gas, such as acetylene, are respectively supplied to inlets 10 and 11 of control valves V. From the outlets of control valves V, oxygen hoses 12 and acetylene hoses 13 lead to the rear end of blowpipes B and B', where the proportions of the combustible mixture are adjusted by regulating valves 14. The combustible mixture of gases is formed by mixers disposed within blowpipes B and B', suitable mixers for the purpose being well known. The combustible mixture passes through tubes 15 and forwardly to heads H and H'.

Referring now to Figs. 1 to 3, the carriage C is provided with four wheels 16 which engage the top of flanges F, and one or more of which are driven through a suitable speed reduction gearing located within the housing. Protruding from the carriage housing are a switch 17 for starting and stopping the driving motor; a lever 18 for changing suitable gearing within the housing to effect a relatively high or relatively low speed, or variations thereof; and a lever 19 for shifting a clutch mechanism to neutral, forward or reverse positions. The position of lever 18 is normally left unchanged during hardening operations, and lever 19 is normally merely shifted from forward to neutral, or vice versa, since the carriage is sufficiently light so that it may be pulled back by hand at the end of each hardening stroke through a rear handle 20. In its commercial embodiment, normal complements of carriage C include a cross arm 21, horizontal adjustment of which is effected by a hand wheel 22; a vertical bracket 23 mounted at the end of cross arm 21; and a slide 24 adjustable upwardly and downwardly of bracket 23 by a hand wheel 25. The blowpipe support U is secured to slide 24 by a bolt 26.

The blowpipe support U comprises a slotted horizontal arm 27, along which blowpipe B' is horizontally adjustable, and a vertical slotted arm 28, which is horizontally adjustable along arm 27.

Vertical arm 28 may be clamped at any horizontal position along arm 27 by a bolt 29 which extends through the slot in arm 27. Blowpipes B and B' are held in clamps 30 and 31, respectively, in which the blowpipes may be turned or pivoted about their longitudinal axes for positioning purposes and the clamps then tightened. Clamp 30 is mounted on a slide 32 which is pivotal about a horizontal axis and which may be secured in any desired angular and/or vertical position along vertical arm 28 by a bolt 33 which extends through the slot in arm 28. Clamp 31 is mounted on a slide 34, which is pivotal about a vertical axis and which may be secured in any desired angular and/or horizontal position along arm 27 by a bolt 35 which extends through the slot in arm 27.

In treating the teeth of spur gears, for instance, heads H and H' are placed in the desired positions by proper adjustment of slides 32 and 34 and vertical arm 28—blowpipes B and B', if necessary, being turned about their longitudinal axes prior to tightening clamps 30 and 31, respectively. However, in treating tapered teeth, such as the teeth of bevel gears, bolt 35 is left slightly loosened, so that blowpipe B' is relatively easily movable about bolt 35 as an axis. This will permit lever mechanism L, which is secured to clamp 31, easily to cause blowpipe B' to pivot and thereby cause head H' to follow the desired path of travel in a direction at an angle away from the side of the tapered tooth.

Gas control valves V and solenoids W are mounted on a vertical panel 36, the lower end of which is secured to cross arm 21. Valves V are connected to solenoids W by operating plungers 37, and each solenoid is provided with a switch 38 so that the solenoids may be rendered inoperative when manual operation of the valves, by means of their handles 39, is desired.

The speed control device D, illustrated in greater detail in Figs. 9 and 10, includes a pinion 40 mounted on a shaft 41 which is directly connected to, or formed as an extension of, a spider 42. Spider 42 is secured to the governor cap K, and the outboard end of shaft 41 is journalled in a bearing 43, as in Fig. 10. Bearing 43 is mounted in a suitable aperture in an upstanding rear leg 44 of a casting 45, and bearing 43 is provided with a grease cap or flange 46, secured to rear leg 44 by cap screws, as shown, or in any other suitable manner. Casting 45 is bolted, or removably secured in any other suitable manner, to the housing of carriage C.

Pinion 40 is thus directly connected to governor cap K, and cap K may be turned by rotating pinion 40. For this purpose, pinion 40 is engaged by a horizontally disposed and transversely movable rack 47, which, as in Figs. 3 and 9, extends through suitable slots in either side of a cover plate 48 forming a protective housing for the speed control device D. Rack 47 is adjustably mounted atop a block 49, a tongue and groove connection being formed between rack 47 and block 49, as in Fig. 10. The position of rack 47 along block 49 may be adjusted by a bolt 50 which cooperates with a plate 51, as in Fig. 9. Bolt 50 threadedly engages block 49 and is provided with a lock nut 52, while plate 51 is secured to the end of rack 47 in a suitable manner, such as by welding. Block 49 rests upon, and slides along, raised lips 53 which are disposed on opposite sides of a transverse slot 54 in the bottom of casting 45. Rack 47 and block 49 are guided during transverse movement by rollers 55 mounted in front bearing forks 56 and rear bearing forks 57, respectively. Front bearing forks 56 are secured to an intermediate upstanding leg 58 of casting 45 in a suitable manner, such as by welding; while rear bearing forks 57 are provided with studs 59 which extend through suitable apertures in rear leg 44, the rear bearing forks being adjustably secured to the rear leg by lock nuts 60 on studs 59.

For moving block 49 to adjust the position of governor cap K and thereby regulate the speed of traverse, a cam pin 61 extends downwardly from block 49 and through slot 54. The lower end of pin 61 is provided with a cam engaging roller 62, and pin 61 is movable vertically in a drilled hole 63 in block 49. Extending outwardly from hole 63 is a groove 64, which is machined in block 49 and in which is disposed a lever 65 for moving pin 61 from an upper to a lower position, and vice versa. When pin 61 is in the lower position, roller 62 will engage speed controlling cam surfaces of template T; and when pin 61 is in the upper position, roller 62 will be withdrawn, so that the apparatus may be moved at will without changing the position of the speed control mechanism, and also there will be less opportunity for pin 61 or roller 62 to become damaged by accidentally striking a portion of the track or other objects.

Lever 65 is pivoted on a pin 66 which extends through a cover plate 67 closing groove 64, and pin 66 threadedly engages block 49. The outer end of lever 65 extends outwardly beyond block 49, thereby being accessible for manual operation; while the inner end of lever 65 is provided with a drilled hole 68 which receives a pin 69 extending from one end of a pin block 70, as in Fig. 9. Extending from one side of pin block 70 at right angles to pin 69, as in Fig. 10, is a relatively short pin or teat 71 which engages a suitable hole drilled in the upper end of cam pin 61. The upper end of cam pin 61 is cut away to receive pin block 70. To provide a snap action to upward and downward movement of cam pin 61, a coil spring 72 surrounds pin 69 and presses against the end of lever 65 and pin block 70. Upward movement of cam pin 61 is limited by the engagement of the upper end of the cam pin with the upper end of drilled hole 63. A stop 73, bolted to the end of block 49, as in Fig. 9, is engaged by lever 65 to limit downward movement of cam pin 61.

The inertia of block 49 and other portions of speed adjusting device D, as well as the effect of suitable provision within carriage C for the purpose, is such that governor cap K and cam pin 61 remain set in any particular position until moved from that position by an outside force or agency. Thus, the speed of carriage C will remain constant until cam pin 61 is forced to the left or right, as the case may be, such as by engagement of roller 62 with suitable cam surfaces provided on template T. A further result of this inertia effect is that cam pin 61 and roller 62 need not be guided by a slot into which they extend, but instead cam pin 61 may be pushed either to the left or to the right from any particular position merely by roller 62 engaging the edge of a suitably shaped plate cam. This permits easier adjustment of the parts of template T to provide different variations in speed, as will be more clearly apparent from a later detailed description of template T.

Switch S, which controls the operation of solenoids W, is disposed at the rear of the apparatus, a supporting leg 74 thereof being bolted to casting 45. Switch S is preferably of such a type that when tumbler 75 thereof is pressed inwardly, the switch will be turned on, and the next time tumbler 75 is pressed inwardly, the switch will be turned off, and so on. An arm 76 at the lower end thereof, and a lever 77 centrally thereof, are pivoted on a pin 78, pin 78 being mounted between upstanding ears at the end of a bracket 79 secured to the lower end of switch S. A tumbler operating lever 80, one end of which is pivoted on arm 76 and the other end of which is provided with a pin adapted to engage tumbler 75, actuates tumbler 75 when arm 76 is pressed forwardly. When the lower end of lever 77 encounters either of two stops or obstructions provided on template T, as the traversing mechanism moves forwardly, the lower end of lever 77 will be forced backwardly, thus forcing arm 76 forwardly and thereby actuating tumbler 75 and switch S. The construction of the stops provided on template T will be described later, but, in general, one stop is so placed that switch S will be turned on, thereby causing the heating gases also to be turned on, just before the tooth is reached by the heating heads; and the second stop is so placed that switch S will be turned off, thereby shutting off the heating gases, just as the end of the tooth is reached by the heating heads.

Arm 76 and lever 77 are pivoted separately on pin 78, a suitable coil spring 77a (Fig. 3) normally holding lever 77 in the full position of Fig. 10. However, when the traversing mechanism is moved back at the end of a hardening stroke to place the apparatus in position for treatment of the next tooth, lever 77 swings forwardly to and above the dotted position of Fig. 10 and passes over both stops in succession without actuating switch S. A housing 81 extends rearwardly and then downwardly, principally to protect arm 76 and lever 77. A clamp 82 holds cable E' and thereby prevents the cable from being pulled out of its connections with the switch.

The template T, as in Fig. 4, includes a base plate 83 and front and rear speed regulating plate cams 84 and 85, each of which rests upon base plate 83 between lateral strips 86. Template T is removably secured to the web of track A in a suitable manner, such as by machine screws 87 (see also Fig. 9). The elevation of base plate 83 above the web of track A, and consequently also that of plate cams 84 and 85, is determined by spacers 88 disposed beneath base plate 83. Referring now to Figs. 4 and 6, plate cams 84 and 85 are held against base plate 83 by clamps 89, in turn held by cap screws 90 which threadedly engage strips 86. Plate cams 84 and 85 may be moved longitudinally to any desired positions on base plate 83 and clamped in such positions, while threaded holes 91 permit clamps 89 to be placed in a variety of positions along strips 86.

Rear plate cam 85 is provided with suitable cam surfaces to be engaged by roller 62 in providing a relatively slow initial speed and acceleration as heat picks up. A longitudinally extending surface 92 determines the initial speed, and an inclined surface 93 effects acceleration. Front plate cam 84 is provided with a sharply inclined surface 94 for effecting a rapid acceleration as the end of a tooth is approached, and a longitudinally extending surface 95 permits the carriage to run past the tooth in case the carriage is not stopped immediately. To bridge the gap between rear plate cam 85 and front plate cam 84, and also to effect any desired slight increase in speed between traverse of the initial and final portions of the tooth surfaces, a bar 96, as in Fig. 4, or an extensible channel 97, as in Fig. 5, may be utilized.

Roller 62 rides along the left side of bar 96 during the treatment of spur gear teeth, and along the inside of the left wall of channel 97 during the treatment of tapered gear teeth, bar 96 being used for controlling the lever mechanism L in the latter instance.

The rear end of bar 96 or channel 97 may be secured to rear plate cam 85 by a screw 98, and the forward end of bar 96 is held by a clamp 99 provided with a pin 100 which engages a longitudinal slot 101 in bar 96. Clamp 99, as in Figs. 4 and 8, is itself provided with a longitudinal slot over the greater portion of its length, and at one end a raised portion from which pin 100 depends. Clamp 99 is adjustable along and secured in a transverse groove 102 machined in front plate cam 84, and a bolt 103 is adapted to secure clamp 99 in any desired position. Bolt 103 extends through a slot 104 machined in plate cam 84 centrally of groove 102, a second groove being machined on the underside of the plate cam to accommodate the head of bolt 103. The forward end of extensible channel 97 is secured in a similar manner to plate cam 84, as in Fig. 5, by a bolt 105 extending through a slot 106 which is parallel to sharply inclined surface 94. A groove 107 is machined on the underside of plate cam 84 to accommodate the head of bolt 105. Bar 96 and channel 97 may be placed in any inclined position to effect any particular increase in speed desired.

Bar 96 is placed in an inclined position for the treatment of tapered gear teeth, as in Fig. 5. For this purpose the rear end of the bar is secured to rear plate cam 85 by a screw 108, while the forward end of the bar is secured in any desired transverse position by clamp 99, the position of the clamp in groove 102 being reversed from its position in Fig. 4.

While carriage C is being returned to the starting position after a tooth has been treated, and since sharply inclined surface 94 has previously forced them to the extreme left position, the path of roller 62 and cam pin 61 will parallel the left hand strip 86 until roller 62 engages an inclined surface 110 on rear plate cam 85. This inclined surface will return roller 62 to the initial or starting position, between longitudinal surfaces 92 and 111. The lateral distance between longitudinal surface 95 and left hand strip 86, and also between longitudinal surfaces 92 and 111, is slightly greater than the diameter of roller 62 to provide a slight clearance therebetween.

As previously stated, suitable stops for actuating lever 77 of switch S are provided on template T. A rear stop 115 is secured to the rear plate cam 85 to actuate switch S to turn on the heating gases, and a forward stop 116 is secured to front plate cam 84 to actuate switch S to turn off the heating gases. Stops 115 and 116 are adjustable longitudinally of the plate cams, being secured in any desired position by cap screws 117 which threadedly engage T-blocks 118, as in Fig. 7. Cap screws 117 extend through slots 119 in the respective plate cams, and suitable grooves, such as groove 120 in plate cam 85, are machined in the underside of the plate cams to accommodate the heads of T-blocks 118.

As the carriage C moves forwardly on the hardening stroke, lever 77 of switch S will encounter rear stop 115 and be pushed backwardly a sufficient distance to actuate switch S before the lower end of the lever will clear the stop. This will cause switch S to be actuated to energize solenoids W controlling valves V, whereby the heating gases will be turned on just before the tooth is reached by the blowpipe heads H and H'. Just as the end of the tooth is reached, lever 77 will encounter forward stop 116 and again will be pushed backwardly a sufficient distance to actuate switch S before the lever clears the forward stop. However, since the switch was turned on when actuated previously, this time the switch will be turned off, thereby causing the heating gases to be shut off, in a manner readily understood. The next time the switch is actuated, the heating gases will be turned on, but this will occur on the next forward or hardening stroke, since while carriage C is being returned to the starting position, lever 77 will swing forwardly to and above the dotted position of Fig. 10 and pass over stops 115 and 116 without actuating switch S, as indicated previously.

Lever mechanism L includes a pin 125, as in Fig. 9, which is held by a coil tension spring 126 against the left side of bar 96 when the bar is in the position shown in Fig. 5. The motion imparted to pin 125 by bar 96 is transmitted through the lever mechanism to a lever 127, as in Fig. 1, one end of lever 127 being bolted to clamp 31 in which blowpipe B' is secured. As indicated previously, bolt 35 which secures clamp 31 and slide 34 to horizontal arm 27 of the blowpipe support U is left slightly loosened so that blowpipe B' can be pivoted easily.

One end of spring 126, as in Figs. 1 and 9, is secured to pin 125 and the other end thereof is secured to an ear formed on the end of an angle shaped bracket 128, in turn secured by nuts 60 on studs 59 to rear leg 44 of casting 45. Pin 125 extends through and is mounted in a boss 129 at the outer end of a lower arm 130, as in Figs. 9 and 10, while lower arm 130 and an upper arm 131 are secured to opposite ends of a stub shaft 132. Stub shaft 132 pivots in bearings 133 which are secured to, or formed integrally with, rear leg 44 of casting 45, while a spacer 134 is disposed between the upper bearing and upper arm 131 to position the upper arm at any desired height. The outer end of upper arm 131 is disposed directly above and movement thereof is identical with movement of pin 125.

An adjustable connection transmits movement of upper arm 131 to blowpipe lever 127. As in Figs. 1 and 3, this connection includes a relatively long rod 135, a relatively short rod 136, and a spring chuck or tube 137 provided with a spring lock nut 138 engaging the upper threaded end thereof. Rod 136 is pinned to the lower end of tube 137, while rod 135 extends into tube 137 from the upper end thereof. A coiled compression spring (not shown), disposed within tube 137 and bearing between the ends of rods 135 and 136, prevents rod 135 from slipping downwardly by accident when lock nut 138 is loosened to adjust the longitudinal position of rod 135. It is thus a relatively easy matter to adjust rod 135 in tube 137, it being only necessary to push rod 135 down into tube 137 to the desired position and then tighten lock nut 138.

Since the end of upper arm 131 normally moves on a much smaller radius than the rear end of lever 127, a pair of ball and socket joints 139, one of which is shown more clearly in Fig. 9, is provided. One ball and socket joint connects the rear end of lever 127 with rod 135, and the other ball and socket joint connects rod 136 with the end of arm 131. These ball and socket joints permit substantially universal movement and prevent binding of any parts during transmission of movement from arm 131 to blowpipe lever 127.

Before describing the simplified apparatus illustrated in Fig. 11, it is desirable to indicate the steps involved in hardening spur gears, and also tapered or bevel gears, with the apparatus of Figs. 1-10.

For hardening teeth of spur gears, flanges F of track A are placed parallel to the tooth to be hardened, and heads H and H' placed in general vertical and horizontal alignment with the tooth by proper adjustment of cross arm 21 and slide 24. Blowpipes B and B' are placed in substantially parallel relation, and also turned in clamps 30 and 31, respectively, so that the faces of heads H and H' will be substantially parallel to a tangent to each tooth surface at or adjacent the pitch line. Heads H and H' are then placed in exact alignment, transversely and longitudinally of the gear tooth, by proper adjustment of slides 32 and 34, and vertical arm 28. Template T is arranged properly, such as in Fig. 4, with plate cams 84 and 85, as well as stops 115 and 116, spaced the proper distances apart in accordance with the length of tooth to be treated. The combustible mixture is regulated by valves 14 so that the heating flames will burn properly. A continuously burning pilot light, such as a tube conveying an air-acetylene or air-city gas mixture to a point closely adjacent heads H and H', may be provided so that the heating flames will be ignited as soon as the heating gases are turned on. The quenching medium, particularly when an inexpensive medium such as water is used, may be left on during the treatment of all the teeth of a gear. Or, if desired, a suitable valve or valves may be actuated by solenoids W at the same times as valves V so that the quenching medium will be turned on only during actual hardening.

With the carriage in the starting position for the hardening stroke, pin 61 and roller 62 are lowered between longitudinal surfaces 92 and 111 of plate cam 85. As the carriage moves forward, after the motor is started by switch 17, lever 77 of switch S will encounter rear stop 115, thus actuating switch S and causing the heating gases to be turned on in the manner previously described. As the carriage moves further forwardly, roller 62 will pass from longitudinal surface 92 and encounter inclined surface 93, which will push the roller and cam pin 61 to the left and thereby cause the speed of traverse to be increased as heat "picks up." As soon as it leaves surface 93, roller 62 will pass along the left side of bar 96, which will push the roller and pin 61 further to the left and thereby cause the speed of traverse to be increased by slight increments, and thereby compensate for the tendency for heat to build up and "spread ahead" of the heating flames. As the end of the tooth is approached, roller 62 will encounter sharply inclined surface 94 of plate cam 84, and the speed will be increased considerably as the leaving portion of the tooth is traversed. As the end of the tooth is reached, lever 77 of switch S will encounter forward stop 116, thereby actuating switch S and turning off the heating gases as explained previously. The carriage motor is then stopped by throwing switch 17, and roller 62 will be somewhere along longitudinal surface 95 of plate cam 84 at the end of the hardening stroke.

To return the carriage C to the starting position for the next hardening stroke, i. e., for treatment of the next tooth, it is necessary only for the operator to grasp rear handle 20, as the carriage may be pulled relatively easily. Of course, if desired, a suitable solenoid or similar mechanism for actuating switch 17 may be included, the solenoid being controlled by switch S or other suitable means for starting, stopping and reversing the carriage drive motor. Or, if desired, the reverse lever 19 may be thrown to place the driving mechanism in reverse and return the carriage to the starting position. After the carriage is returned to the starting position, the gear is turned or indexed to place the next tooth in position for treatment and the hardening stroke repeated.

For hardening tapered gear teeth, bar 96 is replaced by extensible channel 97 as in Fig. 5, and the distance between plate cams 84 and 85 and the positions of stops 115 and 116 adjusted for the length of tooth to be treated. In hardening the teeth of a spiral bevel gear, the gear may be mounted on bearings for easy rotation and turned as each tooth is traversed by a suitable finger arrangement secured to carriage C and engaging a tooth spaced from the tooth being treated. The finger will turn the gear an amount equal to the normal displacement of the center line of the tooth being treated as the carriage moves forward.

Of particular importance in treating tapered teeth, and to carry out the method of this invention described previously, the track A is placed so that flanges F diverge from the center line of the tooth at a greater angle than the surface or side of the tooth which is treated by blowpipe head H. Blowpipe B and head H remain relatively fixed with respect to support U, but the bolt securing slide 34 to arm 27 is loosened slightly so that blowpipe B' can be turned or pivoted easily by lever mechanism L, as indicated previously. The position of track A and flanges F, of course, causes head H to diverge from the left side of the tooth being treated as the carriage moves forward, and bar 96 is placed at the proper angle to cause head H' to diverge in an identical manner from the right side of the tooth. (It is to be noted that movement of pin 125 to the left causes head H' to move to the right, and vice versa.) After the distance between lever 127 and arm 131 is adjusted by pushing rod 135 into tube 137 and tightening lock nut 138, the operation proceeds in substantially the same manner as in the previously described treatment of straight or spur gear teeth.

By the simplified apparatus of Fig. 11, speed regulation is effected accurately by manual adjustment of motor governor cap K, and the heating gases are automatically turned off at the end of each hardening stroke. A scale 143 is attached to the flange F of track A and an indexing pointer 144 is secured to the housing of carriage C. To assist the operator in accurately adjusting governor cap K manually, in accordance with the distance along the tooth traversed, scale 143 is provided with a rod 145 on which are mounted a plurality of longitudinally adjustable collars, such as collars 146, 147, 148, and 149. These collars are placed at the exact points in the path of traverse at which changes in speed or other operations are to be effected. With the carriage C in the longitudinal position shown in Fig. 11, the motor driving carriage C is started and the heating gases are turned on. The cap K is adjusted to the slow speed or starting position. When pointer 144 comes opposite collar 146, the speed is increased gradually but relatively quickly until the pointer reaches collar 147. When the pointer reaches collar 147, the speed is increased gradually and slightly until the pointer reaches collar 148. When the pointer reaches collar 148, the speed is increased rapidly until the pointer reaches collar 149, at which time the carriage motor is stopped. As will be surmised, the increase in speed between collars 146 and 147 corresponds to that effected by the inclined surface 93 of plate cam 85; the gradual increase in speed between collars 147 and 148 corresponds to that effected by bar 96 disposed as in Fig. 4; and the rapid increase in speed between collars 148 and 149 corresponds to that effected by sharply inclined surface 94 of plate cam 84.

For automatically turning off the heating gases at the end of the hardening stroke, valves V may be mounted on a horizontal platform 150, handles 39 of the valves being connected for simultaneous operation by a common lever 151. At the start of each hardening stroke, the handles 39 are thrown manually to the full position of Fig. 11 to turn on the heating gases. To hold the valves open during treatment, an operating lever 152 is pivoted on the handle of the forward valve, and lever 152 is provided with a hook 153 which is adapted to engage a latch 154. A spring 155 normally keeps hook 153 in engagement with latch 154 until the latch is disengaged by a push rod 156. Spring 155 will then pull the valve handles back to the dotted position of Fig. 10, and thereby turn off the heating gases. The push rod 156 is movable vertically in a suitable bushing and is provided at its lower end with a roller 157 adapted to engage a stop 158 secured along the track in a suitable position for causing the heating gases to be turned off at the proper time.

Instead of the semi-automatic apparatus of Fig. 11, utilized for turning off the heating gases, a limit switch such as is provided in the apparatus of Figs. 1 to 10, with operating solenoids and appurtenant apparatus may be used. However, the valve operating apparatus of Fig. 11 is much simpler and considerably less expensive.

Although particular embodiments of apparatus constructed in accordance with this invention have been illustrated and described in detail, it will be understood that changes may be made in the construction of the apparatus, particularly in the layout and construction of template T. It will also be understood that a traversing mechanism other than a carriage moving along a track may be used, and that the manner in which the various parts are mounted on the traversing mechanism may vary widely. It will be further understood that the method and apparatus of this invention may be utilized in treating portions of articles other than the teeth of gears, such as the threads of large worms, and that sources of localized high temperature heat other than heating flames discharged from a blowpipe head, such as electrical induction heating elements, may be utilized. Further changes and modifications are also possible without departing from the spirit and scope of this invention.

What is claimed is:

1. Heat treating apparatus comprising means for locally heating a portion of a surface of a ferrous metal body; a track having side rails; a movable support for said heating means, said support having wheels engaging the rails of said track; an electric motor on said support for driving said wheels along said rails to effect a relative movement between said heating means and said surface; a governor operatively connected with said electric motor and adapted to effect variations in the relative speed of traverse of said heating means; and means for controlling said governor, said last-mentioned means including a rotary member on said governor and a cooperating member mounted on said support adjacent said governor for movement transversely of said support, a cam follower depending from said transversely movable member, and a template disposed between the rails of said track and having a cam surface adapted to engage said follower and move said cooperating member transversely of said support to rotate said rotary member and thereby control the relative speed of traverse of said heating means.

2. Heat treating apparatus comprising means for locally heating a portion of a ferrous metal body; a movable support on which said heating means is mounted; means for moving said support to effect a relative movement between said heating means and said surface; adjustable means for controlling said moving means to vary the relative speed of traverse of said heating means; and means for adjusting said control means during traversal of said surface by said heating means; said adjusting means including a transversely movable cam follower and a template provided with cam surfaces engaged by said follower and comprising a plurality of plate cams having cam surfaces adjustable longitudinally of the direction of movement of said support, and means for connecting the cams of adjacent plate cams to control the position of said cam follower in passing from one plate cam to the next plate cam.

3. Apparatus for heat treating a tapered gear tooth comprising means for locally heating successive portions of the surface on one side of said tooth; means for locally heating successive portions of the surface on the opposite side of said tooth; a movable carriage; means for supporting one of said heating means on said carriage in positively fixed position with respect to said carriage; means for supporting the second heating means on said carriage for movement with respect to said carriage; and means for causing the second heating means to move with respect to said carriage during movement of said carriage.

4. Apparatus for heat treating a tapered gear tooth as defined in claim 3, in which each of said heating means comprises a blowpipe head adapted to direct a plurality of high temperature heating flames against one of the opposite surfaces of said tooth.

5. Apparatus for heat treating a tapered gear tooth as defined in claim 3, in which said carriage and said positively fixed heating means move along a path which diverges from the center line of said gear tooth at a greater angle than the side of said tooth heated by said positively fixed heating means, and which includes means for causing said second heating means to follow a path correspondingly diverging at a greater angle than the opposite side of said tooth, as said tooth is traversed from the small to the large end thereof.

6. Heat treating apparatus comprising means for locally heating a portion of a surface of a ferrous metal body; a movable support for said heating means; a motor for driving said support; a governor for varying the speed of said motor; rack and pinion means connected with said governor; a cam follower operatively connected with said rack and pinion means; and a template having cam surfaces engageable by said follower to move said rack and pinion means and thereby change the position of said governor to control the speed of said motor.

7. Heat treating apparatus comprising a blowpipe having a head adapted to direct high temperature heating flames against a portion of a surface of a ferrous metal body; a movable support for said heating means; means for supplying a combustion-supporting gas and a combustible gas to said blowpipe; means for controlling the flow of heating gases; a switch for controlling the operation of said flow control means; and a template having stops adapted to actuate said switch at predetermined points in the path of movement of said support.

8. Heat treating apparatus as defined in claim 7, in which said switch is provided with a pivoted lever adapted to engage said stops and actuate said switch during movement of said support in one direction and adapted to pivot upwardly and over said stops without actuating said switch during movement of said support in the opposite direction.

9. Apparatus for heat treating gear teeth or the like, comprising a pair of blowpipe heads each adapted to direct high temperature heating flames against one of the opposite surfaces of a gear tooth, a movable support for said blowpipe heads, means for moving said support to cause said blowpipe heads to locally heat successive portions of said opposite sides; means for controlling said moving means to regulate the relative speed of traverse of said support; a template disposed in the direction of travel of said support and comprising a pair of cams cooperating with said controlling means for actuating the same at the exact positions along the path of travel of said support at which the relative speed of said support is to be varied, the first of said cams being so disposed on said template that the relative speed of said support may be increased at or shortly after the initial portions of said tooth surfaces are heated, the second of said cams being so disposed on said template that the relative speed of said support may be increased considerably when the final portions of said tooth surfaces are being heat treated, and means carried by said support and actuated by said template for shutting off heating gases supplied to said blowpipe heads at least as soon as the final portions of said tooth surfaces have been treated.

10. Heat treating apparatus comprising means for locally heating a portion of a surface of a ferrous metal body; a track having side rails; a movable support for said heating means, said support having wheels engaging the rails of said track; means for moving said support along said track to effect a relative movement between said heating means and said surface; a governor operatively connected with said moving means and adapted to effect variations in the relative speed of traverse of said heating means; means including a switch for controlling said heating means; and means for controlling said governor and said switch, said last-mentioned means including a template having stops adapted to actuate said switch at predetermined points in the path of movement of said support, said template also being provided with cam surfaces and said means including a cam follower depending from said support and adapted to engage said cam surfaces to control the relative speed of traverse of said heating means.

11. Heat treating apparatus for hardening surfaces of tapered gear teeth, comprising a pair of heating heads, a track having side rails; a carriage having wheels engaging the rails of said track; a cross arm mounted on said carriage; means for mounting said heating heads on one end of said cross arm for pivotal movement of at least one of said heads toward and away from said carriage; means mounted on the other end of said cross arm for controlling the supply of heating energy to said heating heads; flexible means extending from one end of said cross arm to the other for conducting said energy from said control means to said heads while permitting said pivotal movement of at least one of said heads; an electric motor mounted on said carriage for driving said wheels to move said heating heads longitudinally of said gear teeth; said motor having a shaft extending longitudinally of said carriage; a governor coaxial with said shaft and having a cooperating member movable transversely of said carriage with a cam follower depending between said wheels and adapted to effect variations in the relative speed of traverse of said heating heads; means including a switch mounted on said carriage ahead of said governor and having a trip depending between said wheels ahead of said cam follower for actuating said means for controlling the supply of heating energy to said heating heads; a link connected to said pivotally mounted said heating head and having a cam follower depending from said carriage between said wheels for moving said heating head laterally with respect to the path of said carriage as it moves along said track to cause said heating head to follow the taper of the gear tooth; and means for controlling said governor, switch and link, comprising a template mounted between said rails in horizontal position and cooperating with said depending trip and cam followers as the carriage moves along the track; said template having stops adapted to engage said trip to actuate said switch, and cam surfaces adapted to engage said cam followers to move said governor cooperating member and said heating head pivoting link.

12. The combination with a torch carriage on which is an electric motor with a governor for holding the motor to a definite speed, of adjustment means for the governor including a rotary member associated with said governor and a cooperating member slidably mounted on said carriage adjacent said governor for movement in a horizontal plane and transversely to the direction of movement of the carriage, and contact devices spaced along the course of movement of the carriage in position to move the slidable member of the governor adjustment means as the carriage passes said contact devices.

13. Torch translating apparatus including an electric motor-driven carriage on which is a speed control means including a shaft, a rotary member mounted on said shaft and a cooperating member movable from one side to the other in one direction to cause an increase in the carriage speed and in the other direction to cause a decrease in the carriage speed, a contact device along the path of travel of the carriage in position to be struck by a part of the movable member to move said member in one direction and another contact device along the path of travel of the carriage and laterally spaced from said first contact device in a horizontal plane in position to be struck by a part of the movable member to move said member in the opposite direction.

14. Torch translating apparatus including an electric motor-driven carriage on which is a speed control means including a member adjustable by rotation and a cooperating member movable from one side to the other in one direction to cause an increase in the carriage speed, and in the other direction to cause a decrease in the carriage speed, and one or more contact devices located along the course of travel of the carriage and transversely spaced from each other in a horizontal plane in the path of a part of the movable member, each contact device being adapted to shift the member one way or the other depending upon whether an increase or decrease in speed is desired at the region of that contact device.

15. A method of heat treating a metal article along a predetermined path by means including a heating torch moved by a driven torch support, which method comprises driving the support slowly at the beginning of the path to be treated so that the torch starts the operation at reduced speed; accelerating the torch speed after the start of the heating operation to a given rate; maintaining the speed of travel of the torch substantially constant at said given rate until the torch approaches near enough to the end of the path so that conduction losses from the region of heating will be reduced; and thereafter accelerating the movement of the torch along the path until the end of the heating operation.

16. Apparatus for moving a blowpipe with respect to a work surface which comprises a track having rails adapted to be disposed adjacent said work surface; a carriage having wheels engaging said rails; means on said carriage for supporting the blowpipe; an electric motor mounted on said carriage for driving said wheels; a governor for said electric motor for varying the speed of movement of said blowpipe; and means for adjusting said governor, comprising means mounted on said carriage adjacent said governor for horizontal movement transversely of said carriage and having a cam follower depending between said wheels, and a template mounted horizontally between said rails and having cam surfaces adapted to engage said follower as said wheels are driven along said rails, to cause said follower to move said adjusting means transversely of the carriage to adjust the governor and thereby vary the speed of the blowpipe relative to said work surface.

17. Heat treating apparatus comprising means for locally heating a portion of a surface of a ferrous metal body; a movable support on which said heating means is mounted; means for moving said support to effect a relative movement between said heating means and said surface; means for controlling said heating means; a template; means actuated by said template for varying the speed of said moving means, and means actuated by the same templet for actuating said controlling means for said heating means.

18. Apparatus for hardening a tapered gear tooth comprising a pair of blowpipe heads, each being adapted to direct high temperature heating flames against one of the opposite sides of said tooth; means for moving said heads along said tooth from the small to the large end thereof; a template mounted in the path of said moving means; and means actuated by said template for controlling the supply of gases to said blowpipe heads, for varying the speed of said moving means, and for moving said heads apart during traversal of said tooth.

19. Apparatus for hardening a tapered gear tooth comprising a pair of blowpipe heads each adapted to direct high temperature heating flames against one of the opposite sides of said tooth; means for moving said heads along said tooth from the small to the large end thereof; means for varying the speed of said moving means while said heads are moving along said tooth to decrease the speed after the initial portions of said sides are heated; and means for moving said heads apart during traversal of said tooth at said varied speed in such a manner that the path of travel of said heads diverges to a greater extent than the sides of said tooth, whereby the height of the effective area heated by said flames progressively increases while the speed of traverse of said flame decreases.

20. Heat treating apparatus as defined in claim 7 in combination with means for moving said support, and means actuated by said template for varying the speed of said moving means.

21. Heat treating apparatus comprising means for locally heating a portion of a surface of a ferrous metal body; a movable support for said heating means; means on said support for controlling said heating means and comprising a trip; a motor for driving said support; a governor for varying the speed of said motor; rack and pinion means connected with said governor; a cam follower operatively connected with said rack and pinion means; and a template having stops engageable by said trip, and cam surfaces engageable by said follower to move said rack and pinion means and thereby change the position of said governor to control the speed of said motor.

22. Heat treating apparatus for progressively heating longitudinally extending surface portions of a ferrous metal body, comprising a track adapted to be located at one side of said body and having side rails adapted to extend parallel to one of said portions; a carriage having wheels engaging the rails of said track; a cross arm mounted on said carriage; means on one end of said cross arm for supporting a pair of heating heads; means for moving one of said heads toward and away from the other; means on the other end of said cross arm for controlling the supply of heating energy to said heads; an electric motor on said carriage for driving said wheels along said rails; a governor for said motor; a template horizontally disposed between the rails of said track; follower means depending from said carriage between the wheels thereof and cooperating with said template upon relative movement thereof; and means responsive to such cooperation for actuating said governor, said supply controlling means and said heating head moving means.

23. Heating apparatus comprising a pair of blowpipe heads adapted to direct high-temperature heating flames against surface portions of a ferrous metal body; means for controlling the supply of fuel gas and oxygen to said blowpipe heads; a movable support on which said blowpipe heads and control means are mounted; means for moving said support to effect a relative movement between said blowpipe heads and said surface; means for causing relative lateral movement of said heads during said movement of said support; means on the side of said support toward said surface portions for mounting said blowpipe heads and said lateral movement means; and means on the side of said support away from said surface for mounting said controlling means, to provide a balanced arrangement.

24. Apparatus for heat treating a metal article which comprises oxy-fuel blowpipe means; means for mounting said blowpipe means comprising a frame providing and supporting a pair of rails, a carriage mounted on rollers engaging said rails, and means for propelling said carriage along said rails; means on the side of said carriage toward said article for supporting said blowpipe means in spaced relation to a surface of said article; pairs of respective gaseous fuel and oxygen passages to each blowpipe means; valve mechanism in each pair of said passages to control the flow of gaseous fuel and oxygen therethrough; and means on the side of said carriage away from said blowpipe means and said article for supporting said valve mechanism, to provide a balanced arrangement.

25. Apparatus for heat treating a metal article of the type described and having a plurality of longitudinally extending surface portions to be treated, the surface portions being displaced laterally with respect to one another, which comprises a compound burner head having blowpipe means corresponding in number and lateral extent with the separate surface portions to be treated; means for mounting said burner head comprising a frame providing and supporting a pair of rails, a carriage mounted on rollers engaging said rails, and means for propelling said carriage along said rails; said metal article to be treated being located with its longitudinally extending portions parallel to said rails and laterally spaced therefrom; means on the side of said carriage toward said article for supporting said burner head with said blowpipe means in spaced relation to said surfaces of said article; pairs of respective gaseous fuel and oxygen passages to each blowpipe means; valve mechanism in each pair of passages to control the flow of gaseous fuel and oxygen thereto; means on the side of said carriage away from said burner head for supporting said valve mechanism to provide a balanced arrangement; and control mechanism operable in the course of traverse of said carriage to turn on the supply of gaseous fuel and oxygen to the blowpipe means which at any instant are in juxtaposition to the surfaces to be treated; said control mechanism comprising a trip associated with said valve mechanism, and means on said frame providing a stop in a path parallel to said rails for engagement by said trip to actuate said valving mechanism.

26. Method of hardening the oppositely disposed surfaces of a tapered gear tooth which comprises positioning a blowpipe head in operative relation with respect to each of said surfaces, each of said blowpipe heads being adapted to direct a plurality of high temperature heating flames against a portion of one of said surfaces extending from a point adjacent the bottom of said tooth to a point adjacent the top of the tooth, effecting a relative movement between said heads and said tooth along paths extending from the small to the large end thereof, turning on the gases to said blowpipe heads automatically in response to arrival of said blowpipes at a starting point in their paths of relative movement, decreasing the speed of said relative movement automatically in response to progress of said blowpipes along their paths of relative movement, the relative movement of one of said heads being along a positively fixed path which diverges from the side of the tooth, and the relative movement of the other of said heads including a transverse component away from the first head, whereby the height of the effective area heated by said flames progressively increases as the speed decreases toward the larger end of the tooth, and the increased spacing permits the slower operating speed without melting the surface under treatment, thus obtaining a soaking heat and greater case penetration and spread.

FRANK McGUIRE, Jr.

REFERENCES CITED

The following references are of record in the file of this patent:

UNITED STATES PATENTS

| Number | Name | Date |
|---|---|---|
| 2,196,902 | Jones | Apr. 9, 1940 |
| 2,148,666 | Young | Feb. 28, 1939 |
| 2,208,212 | Crowe | July 16, 1940 |
| 2,102,040 | Slade | Dec. 14, 1937 |
| 2,132,110 | Holler | Oct. 4, 1938 |
| 2,189,460 | Derhammer | Feb. 6, 1940 |
| 1,768,159 | Shorter | June 24, 1930 |
| 1,514,650 | Bucknam | Nov. 11, 1924 |
| 2,054,425 | Jones et al. | Sept. 15, 1936 |
| 2,067,549 | Sykes | Jan. 12, 1937 |

FOREIGN PATENTS

| Number | Country | Date |
|---|---|---|
| 446,821 | Great Britain | May 4, 1936 |
| 513,715 | Germany | Dec. 1, 1930 |